UNITED STATES PATENT OFFICE.

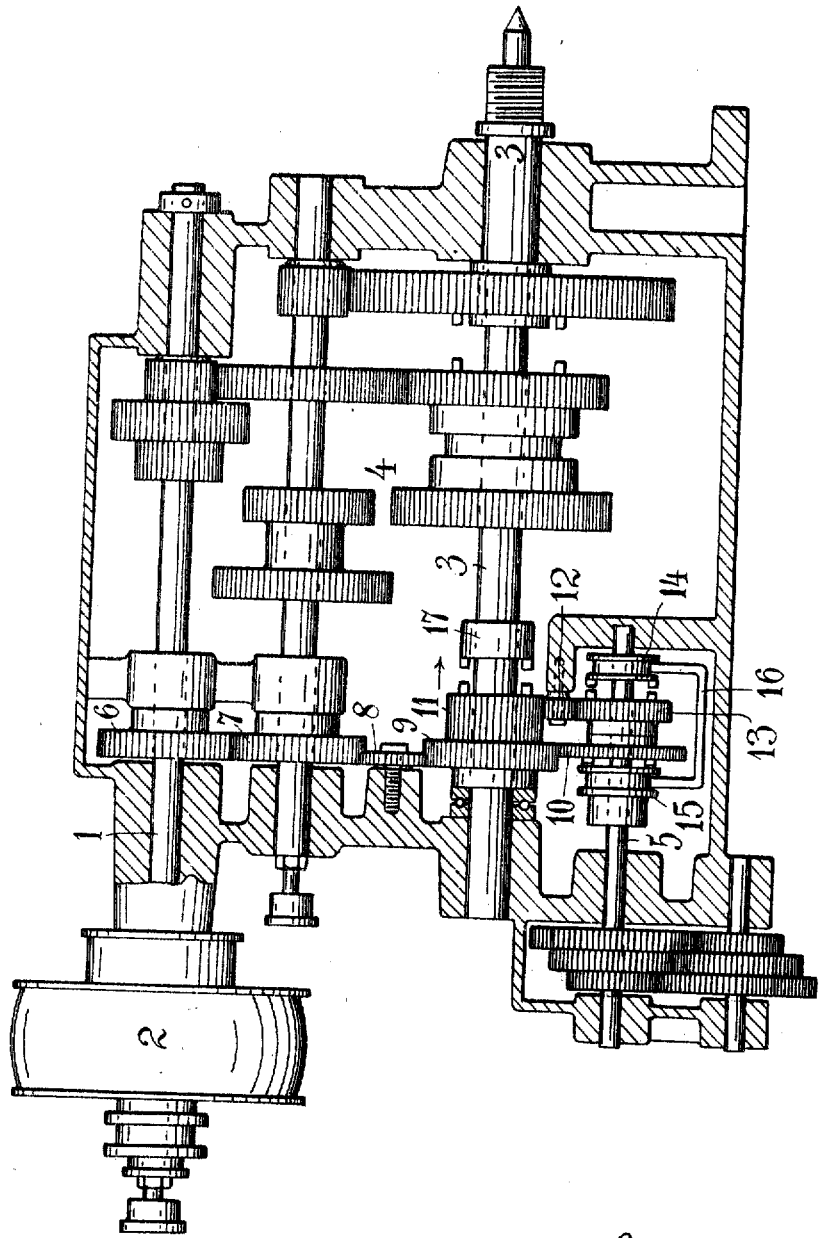

ANDREAS SUNDT, OF CHRISTIANIA, NORWAY.

LATHE-GEARING.

1,209,778.  Specification of Letters Patent.  Patented Dec. 26, 1916.

Application filed June 15, 1916. Serial No. 103,730.

*To all whom it may concern:*

Be it known that I, ANDREAS SUNDT, a subject of the King of Norway, residing at Christiania, Norway, have invented certain new and useful Improvements in Lathe-Gearing; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My present invention relates to improvements in turning lathes and more particularly to turning lathes of the kind which are provided with change gear case, and the object of my invention is to provide a turning lathe of this type in which the guide spindle may be driven directly from the driving shaft independent of the main spindle as well as from the main spindle itself. This according to my invention I attain by the arrangement in the change gear case of auxiliary intermediate gears in such a way, that the counter shaft for the gear box of the feeding spindle or guide screw may be driven directly from the driving shaft independent of the main spindle, so that all the gears of the change gear box as well as of the feeding spindle gear box may be utilized in combination for varying the feed of the guide screw or feeding spindle. By means of this arrangement the guide screw may be worked with a number of different speeds equal to the multiple of the gears of the change gear box of the guide screw.

If for instance the change gear box has 10 gears and the gear box of the guide screw 30 different gears, the guide screw according to the present invention may be worked with 300 different speeds, while if the gear case of the guide screw may only be driven from the main spindle, the guide screw may be worked with 30 different speeds only *e. g.* the number of feeds corresponding to the number of gears in its own gear box.

On the drawing is shown a sectional view through a change gear case according to the present invention.

1 is the driving shaft rotated by means of the pulley 2.

3 is the main spindle, which is driven from the driving shaft by means of the change gear case 4 comprising in the usual way a number of slidable and interchangeable gears.

5 is the counter shaft for the gear case of the guide screw (not shown) and said shaft 5 according to the present invention is directly connected to the driving shaft 1 by means of gears 6, 7, 8, 9, 10.

The gear 9 is loosely mounted on the main spindle 3 and is connected to another gear 11 meshing by means of pinion 12 with gear 13 loosely mounted on counter shaft 5.

Gears 9, 11 are both loosely and slidably mounted on the main spindle 3. Gear 9 meshes directly with gear 10, while gear 11 meshes with gear 13 by means of intermediate pinion 12 thus reversing the movement of counter-shaft 5. Either of the gears 10, 13 may be connected to the counter shaft 5 by means of the claw coupling 14, 15, which is slidably but not rotatably mounted on the shaft 5 and may be caused to engage gear 10 or gear 13 alternately by moving the guide fork 16.

The gears 9, 11 may be slid in the direction of the arrow on the spindle 3 to engage the claw coupling 17 on the same, the gear 9 at the same time being disengaged from gear 8.

When in engagement with the claw coupling 17 the gears 9, 11 are rotated with spindle 3, and thus the counter shaft 5 is driven from the said spindle by means of its gears 10, 13, each of which may be coupled with said shaft by means of the slidable claw couplings 14, 15.

I claim:

1. In a lathe gearing or the like, a change gear case comprising a driving shaft, a main spindle, and a counter shaft for transmitting motion to a feed screw, change gears for driving the main spindle from the driving shaft at different speeds, gears for driving the feed screw counter shaft from the main spindle and auxiliary gears for driving the counter shaft directly from the driving shaft independent of the main spindle.

2. In a lathe gearing or the like, a change gear case comprising a driving shaft, a main spindle, and a counter shaft for transmitting motion to a feed screw, change gears for driving the main spindle from the driving shaft at different speeds, gears for driving the feed screw counter shaft directly from the driving shaft independent of the main spindle said gears comprising a gear wheel loosely mounted on the main spindle, means for coupling said gear wheel with the main spindle and simultaneously disengaging it from direct connection with the driving shaft, without disengaging it from the feed screw counter shaft.

In testimony that I claim the foregoing as my invention, I have signed my name in presence of two subscribing witnesses.

ANDREAS SUNDT.

Witnesses:
 THS. AERG,
 M. RISER.